March 7, 1967 VO DINH HIEN 3,308,382

TUNING CONTROL SYSTEM FOR RADIO RECEIVERS

Filed Oct. 28, 1963 2 Sheets-Sheet 1

INVENTOR.
VO DINH HIEN
BY Eugene M. Whitacre
Attorney

INVENTOR.
Vo Dinh Hien
BY Eugene M. Whitacre
Attorney

United States Patent Office 3,308,382
Patented Mar. 7, 1967

3,308,382
TUNING CONTROL SYSTEM FOR RADIO RECEIVERS

Vo Dinh Hien, Indianapolis, Ind., assignor to Radio Corporation of America, a corporation of Delaware
Filed Oct. 28, 1963, Ser. No. 319,143
5 Claims. (Cl. 325—417)

The present invention relates to manual tuning control systems for radio receivers and the like, and more particularly to tuning control systems for radio receivers with automatic frequency control, such as frequency-modulation (FM) receivers for signal reception in the present FM broadcast band.

Many modern frequency-modulation radio receivers for commercial broadcast-band reception are equipped with automatic-frequency-control (AFC) means which operates to maintain the tuning setting substantially free of drift from any selected signal over a long period of operation. As is understood, it is desirable to first tune a frequency-modulation receiver to a desired signal or station without automatic frequency control, thereby to adjust the receiver accurately to the signal frequency. It is then desirable to apply the automatic frequency control to maintain the tuning at the desired frequency, and this generally is accomplished by switching on an AFC circuit in the receiver. This generally inovlves manually setting or turning on an AFC switch for listening to the receiver program after tuning in a station, and again manually turning off the AFC switch when retuning for another signal or station with proper accuracy for good sound reproduction. The switching operation thus involves a "Normal" or "Off" position of AFC switch means for tuning, and an "AFC" or "On" position of the switch means for continued signal reception or listening.

However, when, after listening to a program from one station or at one signal frequency in the AFC position or operating condition, it is desired to tune to a different program or station, the AFC position or operating condition may be, and most often is, inadvertently maintained, thereby preventing peak tuning to the signal frequency the newly selected station. It is desirable, therefore, to provide means for disengaging or cutting off the AFC control automatically in response to retuning of the receiver, thereby permitting proper tuning without requiring any thought or action on the part of the user to avoid inadvertently maintaining the AFC control in the ON position during the tuning. An AFC switching control means of this type is described in one of my prior copending applications entitled, "Tuning Control System for FM Radio Receivers," Serial No. 229,359, filed October 9, 1962 and now Patent No. 3,166,714.

It is an object of this invention to provide an improved and simplified tuning control system for radio receivers with automatic frequency control, which provides convenient AFC lock-on means for use after tuning to a selected signal, and automatic AFC unlock or release upon resuming the tuning operation for further signal selection.

It is a further object of this invention to provide a tuning control system as above described which provides push-button control for the AFC lock-on means and automatic AFC unlock or release upon resuming tuning operation by movement of a manual tuning control element in either direction of rotation from a tuned-in position.

In accordance with the invention, a radio receiver is provided also with an automatic-frequency-control circuit including an AFC ON-OFF switch. Control means for the tuning control system of the receiver includes a manual tuning control knob mounted on a tubular tuning control shaft which is connected to drive the tuning elements of the receiver. A freely rotatable locking sleeve is concentrically mounted with respect to the tuning control shaft to provide an AFC locking and release means hereinafter described.

The AFC ON-OFF switch is actuated by push-button motion applied thereto through a switch operating rod mounted coaxially within the tubular tuning control shaft. A push-button knob on the outer end of the rod is closely associated with the tuning control knob of the present example, for convenience of operation, and when moved or pressed inwardly actuates the AFC switch through the operating rod, to the ON or AFC position.

The switch operating rod includes a locking pin which extends in a direction normal to the axis of the rod. The locking pin is received in an aperture in the locking sleeve, and when the rod is depressed, the pin causes the locking sleeve to be rotated to a reference position. In the reference position, a blocking stud on the locking sleeve is aligned with the locking pin, so that the operating rod is retained in the depressed position to hold the AFC switch in the ON position.

The tuning control knob and the push-button knob are keyed together so that rotation of the tuning knob causes rotation of the operating rod to disengage the locking pin from the blocking stud. Spring biasing returns the operating rod to its original position, thus causing the AFC switch to be actuated to its OFF position. As soon as the rotary tuning element is moved in either direction for tuning to a different signal or station, the AFC switch is automatically returned to the OFF or NORMAL position.

The invention will, however, be better understood from the following description when considered in connection with the accompanying drawings illustrating certain embodiments thereof, and its scope is pointed out in the appended claims.

In the drawings, FIGURE 1 is a schematic circuit diagram of a frequency-modulation radio receiver with automatic frequency control, provided with a manual tuning control system embodying the invention;

FIGURE 3 is an exploded view of the tuning control system shown in FIGURE 2;

Figure 7:
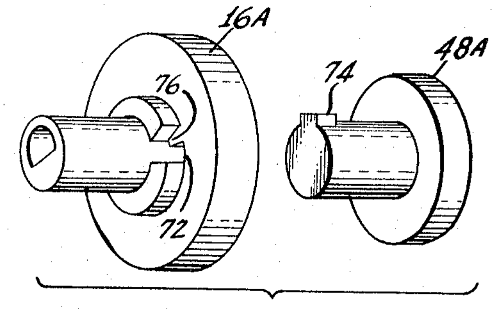
Figure 7:
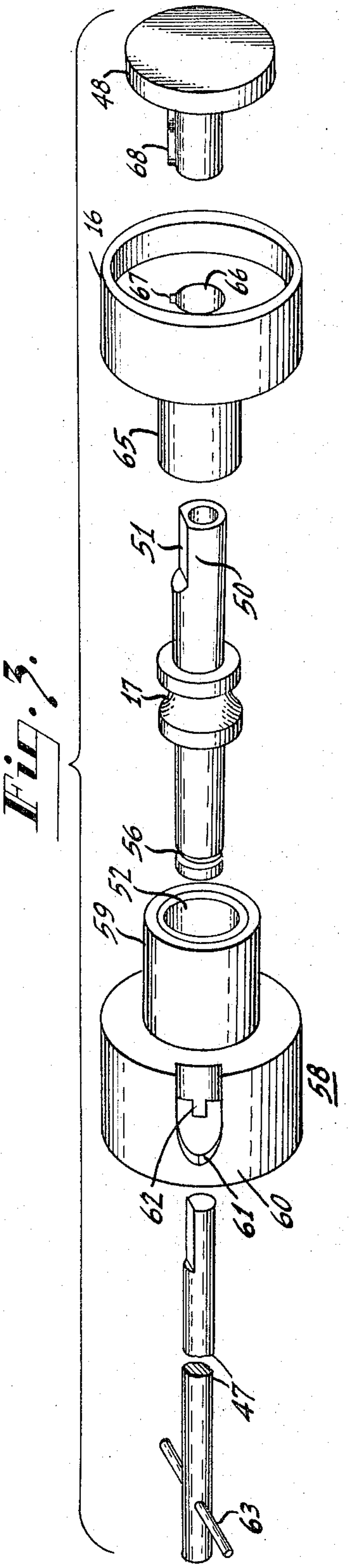

FIGURES 6*a*, 6*b* and 6*c* are diagrammatic illustrations of the operational relationships of certain portions of the tuning control system; and FIGURE 7 is a perspective view of a modified form of the tuning control knob and push-button knob embodying a modification of the invention.

Figure 1:
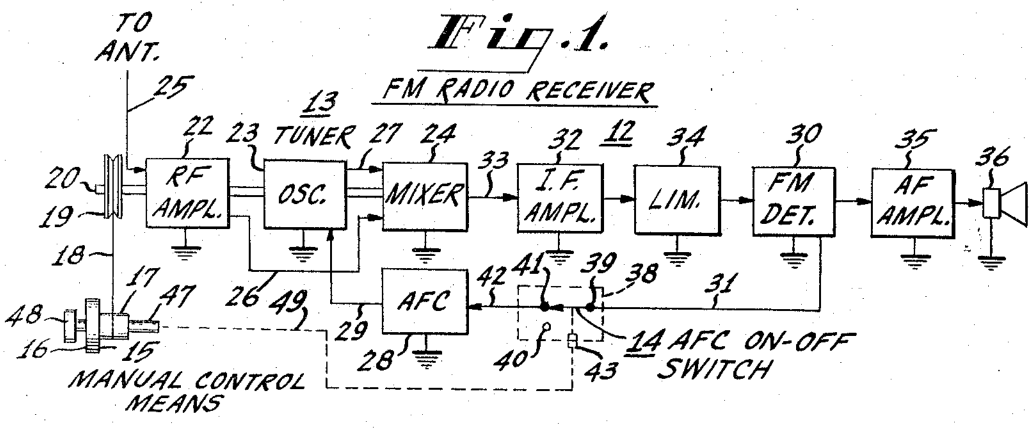
Figure 2:
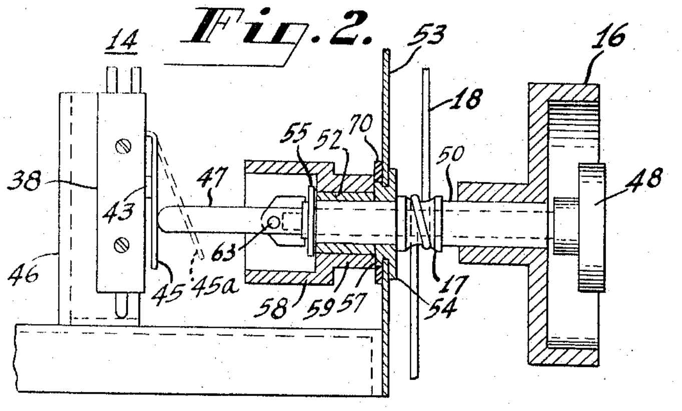
FIGURE 2 is a side view partly in section, of the tuning control system shown in FIGURE 1, further showing the actual structural relation of the parts thereof.
Figure 4:
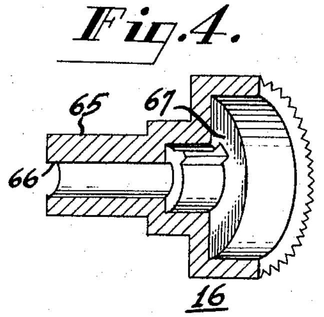
FIGURES 4 and 5 are sectional views, in perspective, of the tuning control knob and locking sleeve structures respectively, which comprise portions of the tuning control system of FIGURES 1–3.
Figure 5:
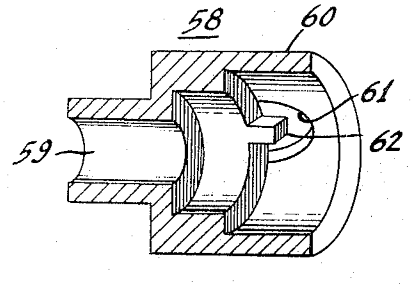

Referring to the drawings, wherein like parts throughout the various figures are designated by like reference characters, and referring in particular to FIGURES 1 and 2, a frequency-modulation radio receiver 12 is provided with a tuner 13, an AFC ON-OFF or control switch 14, and manual control means 15 for tuning and AFC. The latter includes a rotary manual tuning control knob 16 which drives a cord spool or spindle element indicated at 17, in turn connected through cord drive means 18 with a grooved drive pulley 19 on a rotary tuning shaft 20 of the tuner 13.

The tuner comprises an input R.-F. amplifier 22, an oscillator 23 and a mixer stage 24, all tunable jointly through the broadcast FM band by rotation of the common rotary tuning shaft 20 of the tuner. The RF amplifier is connected to an antenna or like signal source through an input signal supply line 25, and is connected to the mixer stage 24 through an output circuit indicated at 26. The oscillator is also coupled to the mixer stage as indicated by the coupling connection 27, and is further placed under control of AFC circuit means 28, connected therewith through an AFC input circuit connection indicated at 29.

The AFC means or circuit 28 is supplied with signal-responsive control voltage from any suitable source, such as the FM detector indicated at 30, and is connected therewith through an AFC voltage supply circuit 31 and the AFC switch 14. The remainder of the receiver may be conventional and includes the usual I.-F. amplifier 32 connected with the output circuit 33 of the mixer stage 24, a limiter stage 34 interposed between the I.-F. amplifier and the FM detector 30, and the usual A.-F. amplifier 35 and output sound reproducing means or loudspeaker 36.

The AFC switch 14 includes a casing 38 mounted in fixed position in the receiver, and is of the two-point type having a movable switch arm or contact 39 connected with the AFC supply circuit through a connection 31, a first or open contact 40 to which the arm 39 is resiliently biased to move, and a second or closed contact 41 connected with the AFC circuit 28 through a circuit connection indicated at 42. The AFC switch includes an externally-projecting push-button 43 connected internally with the switch arm 39. The push-button 43 is actuated by a switch operating lever 45 (FIG. 2) which is normally spring biased to the right, as viewed in FIG. 2, as indicated in dotted outline *45a*. As shown in solid lines in FIGURE 2, the AFC switch is in the ON position, and as shown in FIGURE 1, the switch arm then completes the circuit between the contacts 38 and 41.

The AFC switch 14 is mounted with the casing 38 fixed to a supporting bracket 46, and is operated by an axially-movable switch operating rod 47, the inner rounded end of which is in contact with the switch operating lever 45 as shown in FIGURE 2. The switch operating rod 47 extends coaxially through a tuning control shaft 50 between the switch lever 45 and an external push-button or switch operating knob 48 mounted thereon in close spaced relation to the tuning control knob 16, this operating connection to the switch 14 being indicated in FIGURE 1 by the dash-and-dot line 49.

Referring now to FIGURES 3–6, inclusive, along with FIGURE 2, the switch operating rod 47 is essentially round in cross section and provides a bearing section which fits freely within the tubular tuning control shaft 50. The tuning control shaft 50 includes a flat 51 (FIGURE 3) for receiving the tuning control knob 16. A tubular bearing 52 supported by a chassis wall 53 provides sufficient length and bearing surface to permit the tubular tuning control shaft 50 to rotate smoothly therein in response to rotation by the tuning control knob 16. The shaft 50 is prevented from longitudinal movement in one direction by the shouldered configuration of the cord-drive spool 17, which is integral with the shaft in the present example, in engagement with a bearing 52 staked in the chassis wall 53. In the opposite direction, the shaft 50 is prevented from moving axially by a C washer 55 which clamps into a groove 56 in the tuning control shaft 50.

A locking sleeve 58 is rotatably mounted on the outer surface of the bearing 52, and is also retained in position by the C washer 55. The locking sleeve 58 which may be molded as an integral unit (see FIGURES 2, 3 and 5) includes a bearing surface portion 59, and a locking sleeve portion 60 of larger diameter. The locking sleeve portion 60 includes cam slots 61 in opposite sides thereof, and blocking studs 62 positioned centrally of the cam slots.

The cam slots 61 receive a locking pin 63 which extends transversely of and is carried by the operating rod 47. The cam slots 61 are of sufficient dimension that the locking pin 63 can pass over or be positioned on either side of the blocking studs 62.

The tuning control knob 16 (FIGURES 2, 3 and 4) includes a shaft receiving portion 65 with a generally semi-circular opening 66 therein to receive the complementary shaped end of the tuning control shaft 50. A slot 67 in the knob 16 is adatped to receive a complementary lug or key 68 on the knob 48, so that the knobs 16 and 48 always rotate together. When the AFC switch is in the OFF or NORMAL position, the switch operating rod 47 is urged to the forward position (to the right as viewed in FIG. 2 or 3) by the spring biasing force of the switch operating lever 45. The locking pin 63 then rests against the end of the tuning control shaft 50, and is positioned at one side of the blocking stud 62 as shown in FIGURE 6*a*. Since the locking pin 63 is not biased against the locking sleeve 58, movement of the locking sleeve is not impeded by frictional contact with the locking pin 63.

With the AFC switch OFF, the receiver may be tuned by rotating the tuning control knob 16. Rotation of the tuning control knob 16 also causes, through the slot and key arrangement, rotation of the push-button knob 48. As the push-button 48 and hence the switch operating rod 47 rotate, the locking pin 63 bearing against the blocking stud 62 causes the locking sleeve 58 to rotate.

Figure 6:
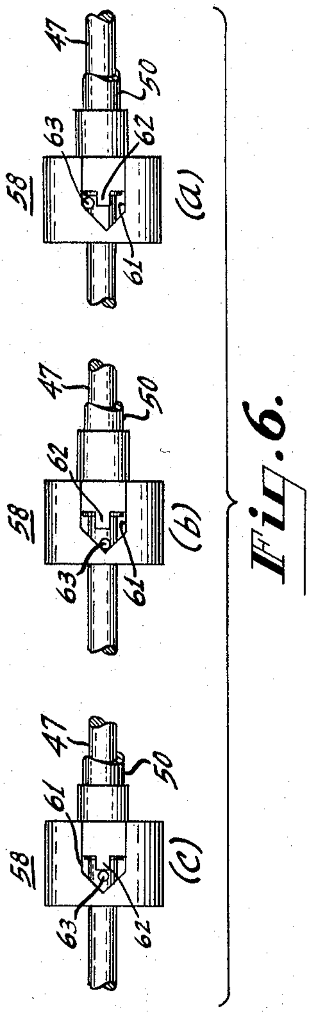

After the desired station has been selected, the AFC switch is then operated by depressing the push-button 48 to move the switch operating rod 47 inwardly, or to the left as viewed in FIGURES 2, 3 or 6, whereby the switch operating lever is moved to turn on the AFC control. As the rod 47 is depressed (pushed in), the locking pin 63 engages the edge of the cam slots 61 in the locking sleeve 58, to cause the locking sleeve 58 to rotate to the position shown in FIGURE 6*b* of the drawings. At this time, the AFC switch 14 has been closed, and the blocking stud 62 is in alignment with the locking pin 63. When the operator releases the push-button 48, the operating rod 47 is urged forward or to the right as is shown in FIGURE 2, so that the locking pin 63 engages the blocking stud 62. Thus the AFC switch is held on the ON position as shown in FIGURES 2 and 6*c* of the drawings.

If, at a subsequent time, it is desired to tune the receiver to a different station, the tuning control knob 16 is rotated in the usual manner causing rotation of the operating rod 47 and locking pin 63. Since the rotation of the locking sleeve 58 is impeded by its frictional engagement with a rubber washer 70 between wall 53 and bearing portion 59, the locking pin 63 rides off the blocking stud 62 to one side or the other thereof depending on the direction of tuning. When the locking pin 63 rides off the blocking stud 62 the rod 47 is moved outwardly, or to the right as is shown in FIGURE 2 under the spring pressure of the switch operating lever 45 to turn the AFC switch OFF.

In accordance with the foregoing it will be seen that the AFC switch is conveniently located concentrically with the tuning control knob for the receiver, and may be easily actuated by finger tip depression thereof. Furthermore, when the receiver is retuned to another station the AFC switch is automatically released to permit peak tuning to a desired station. Thus combined tuning control and automatic AFC unlock means for radio receivers having automatic frequency control is provided by a simplified and low cost construction adapted for use with conventional tuning control elements.

A modification of the invention is shown in FIGURE 7 which permits the AFC switch to be maintained in the ON position even during the tuning operation if desired. This modification of the invention is the same as that described above in connection with FIGURES 1–6 except for minor changes in the control knob 16 and the push-button knob 48. For normal tuning and automatic AFC switch release, the mechanism operates in the same manner as described above. If desired, with the tuning control knob and push-button knob of FIGURE 7, the AFC switch may be maintained on the ON position even during the tuning operation. This is effected by providing a slot 72 in the rear of the tuning control knob 16A. A lug or key 74 on the push-button knob 48A is adapted to ride in the slot corresponding to the slot 67 shown in FIGURE 4. When its is desired to maintain the AFC switch in the ON position during tuning, the push-button knob 48A is depressed fully, and rotated slightly in the clockwise direction so that the key 74 rides up onto the land portion 76 adjacent the slot 72. Under these conditions, the rotation of the tuning knob 16A will cause rotation of the push-button knob 48A and operating rod 47 without automatic release of the AFC switch 14, since the rod 47 will be held in a fully depressed position by the engagement of the key 74 with the land 76. In this position, locking sleeve 58 is free to rotate with the operating rod 47 since no frictional contact is achieved between the locking sleeve 58 and the rubber washer 70.

What is claimed is:

1. A tuning control system for signal receivers with automatic frequency control comprising in combination:
a rotary tuning control shaft,
a switch operating rod extending coaxially through said control shaft and movable axially thereof,
an automatic-frequency-control switch connected with said rod for operation thereby to an automatic-frequency-control position,
a locking sleeve element rotatable about said rod and having a cam surface,
a pin on said rod adapted to engage said cam surface to rotate said locking sleeve element to a reference position when said rod is moved axially,
said locking sleeve element including a blocking stud positioned to rotate into the path of said pin to prevent return axial movement of said rod, and
means for causing said tuning control shaft and said switch operating rod to rotate in unison.

2. A tuning control system for signal receivers with automatic frequency control comprising in combination:
a tuning control shaft mounted for rotation in fixed bearing means,
a switch operating rod extending coaxially through said control shaft and movable axially thereof and adapted to be manually moved axially in one direction,
resilient means for axially biasing said rod in the opposite direction,
automatic-frequency-control means including a switch for actuation by the opposite end of said rod for operation thereby to the closed position in response to movement in said one direction,
a sleeve element rotatable on said rod and having a cam surface defining an aperture,
a pin on said rod extending into said aperture and adapted to engage said aperture and rotate said sleeve element to a reference position when said rod is moved axially in said one direction,
said locking sleeve including a blocking stud extending in said one direction and positioned for alignment with said pin when said sleeve is in said reference position to block return axial movement of said rod in said opposite direction, and
means for coupling said operating rod for rotation with said tuning control shaft whereby said pin is caused to move off said blocking stud and said operating rod is moved axially in said opposite direction by said resilient means to open said automatic frequency control switch.

3. In a signal receiver with automatic frequency control, a tuning control system comprising in combination:
a signal tuner having a rotary tuning shaft,
a rotary tubular tuning control shaft connected to drive said tuning shaft,
rotary control means connected for driving said tuning control shaft,
a switch operating rod extending coaxially through said control shaft and movable axially thereof,
push-button means connected with said rod, said push-button means adapted to be manually operated to impart axial movement to said rod in one direction,
resilient means connected with said rod for urging said rod axially in the opposite direction,
automatic-frequency-control means including a control switch associated with said rod for operation thereby to apply automatic-frequency-control to said receiver in response to movement in said one direction,
a locking-and-unlocking sleeve rotatable about said rod and having a locking element,
a pin on said rod meeting and engaging said locking element to lock said pin and rod and hold the switch in the automatic-frequency-control position, and
means for keying said push-button and said rotary control means for rotation together to release said locking element from said pin thereby to open said switch to cutoff the automatic-frequency-control.

4. In a signal receiver with automatic frequency control, a tuning control system comprising in combination:
a tuner having a rotary tuning shaft,
a tubular tuning control shaft mounted for rotation in fixed bearing means and connected to drive said tuning shaft,
a rotary control knob mounted on one end of said tuning control shaft,
a switch operating rod extending coaxially through said control shaft and movable axially thereof,
push-button means mounted on one end of said rod and adapted to be manually operated to impart axial movement to said rod in one direction,
resilient operating means connected with said rod for imparting axial movement thereto on the opposite direction,
automatic-frequency-control means including a switch connected with said opposite end of said rod for operation thereby to the closed position in response to movement in said one direction,
a locking-and-unlocking sleeve rotatable on said rod and having at least one stop element extending along said rod in said one direction,
a pin on said rod meeting and engaging said stop element to lock said pin and rod and hold the switch in the closed operative position,
means for keying said push-button and said rotary control means for rotation together to release said locking element from said pin thereby to open said switch to cutoff the automatic-frequency-control, and
said push-button including a lug which is adapted to lock into a recess in said tuning control knob upon manual movement of said push-button in said one direction, and rotation of said push-button whereby said rod can be locked to maintain said switch in the closed position during rotation of said rotary control knob.

5. A manual control system comprising:
a first utilization means responsive to rotary motion,
a second utilization means responsive to linear motion,
a first rotatable mounted shaft coupled with said first utilization means,
a second axially movable shaft coupled with said second utilization means,
stop means on said second shaft, spring means coupled with said second shaft to bias said second shaft axially in one direction, movable locking means including a stop portion so that said stop portion is in the path of axial movement of said stop means, said locking means including a cam surface which is engaged by said stop means when said second shaft is axially moved in the opposite direction to align said stop portion in the path of axial movement of said stop means, to prevent axial movement of said second shaft in said one direction, and means coupling said first and second shafts for rotation together whereby rotation of said second shaft moves said stop means out of engagement with said stop portion to release said second shaft.

No references cited.

KATHLEEN H. CLAFFY, *Primary Examiner.*

R. P. TAYLOR, *Assistant Examiner.*